United States Patent
Ono et al.

(10) Patent No.: US 8,878,720 B2
(45) Date of Patent: Nov. 4, 2014

(54) ABNORMAL VALUE DETECTION APPARATUS FOR SATELLITE POSITIONING SYSTEM, ABNORMAL VALUE DETECTION METHOD, AND ABNORMAL VALUE DETECTION PROGRAM

(75) Inventors: Takeshi Ono, Tokyo (JP); Kazushi Suzuki, Tokyo (JP); Takayuki Kaneso, Tokyo (JP); Takayuki Nakata, Tokyo (JP); Kenji Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 13/034,921

(22) Filed: Feb. 25, 2011

(65) Prior Publication Data

US 2011/0227786 A1    Sep. 22, 2011

(30) Foreign Application Priority Data

Mar. 18, 2010 (JP) .................................. 61878/2010

(51) Int. Cl.
| | |
|---|---|
| *G01S 19/40* | (2010.01) |
| *G01S 19/20* | (2010.01) |
| *G01S 19/08* | (2010.01) |
| *G01S 19/07* | (2010.01) |

(52) U.S. Cl.
CPC ............... *G01S 19/07* (2013.01); *G01S 19/08* (2013.01); *G01S 19/20* (2013.01)
USPC ................................. 342/357.23; 342/357.58

(58) Field of Classification Search
CPC ...................................................... G01S 19/20
USPC ........... 342/357.58, 357.45, 357.23; 701/476, 701/468
See application file for complete search history.

(56) References Cited

U.S. PATENT DOCUMENTS

2007/0115171 A1* 5/2007 Rahman et al. .......... 342/357.02
2009/0187381 A1* 7/2009 King et al. .................... 702/181

FOREIGN PATENT DOCUMENTS

JP        2009068927 A    4/2009

OTHER PUBLICATIONS

G. Xie, "Optimal On-Airport Monitoring of the Integrity of GPS-Base Landing Systems", Ph. D. Dissertation, Stanford University, Mar. 2004, pp. 26-32.

* cited by examiner

*Primary Examiner* — Dao Phan
(74) *Attorney, Agent, or Firm* — Sughrue Mion, PLLC

(57) ABSTRACT

To detect an abnormal value in a satellite positioning system with high precision even when the observation environment changes or there is the time series correlation between data. An abnormal value index calculation unit 11 calculates an abnormal value index at each time of time-series data such as a pseudo distance between each artificial satellite and a receiver in the satellite positioning system or the like. A dynamic model forming unit 12 dynamically forms a model from the abnormal value index in a predetermined period and calculates a change point index from the time-series abnormal value index based on the dynamic model. The change point index is an index for determining whether the time-series is a one-shot outlier from a dynamic model or the dynamic model itself of input data changes when the time-series value which suddenly increases and decreases exists. The abnormal value detection unit 13 compares the change point index with a threshold value set in advance and detects the abnormal value index corresponding to the change point index at that time as an abnormal value when the value of the change point index is greater than the threshold value.

10 Claims, 8 Drawing Sheets

ABNORMAL VALUE DETECTION APPARATUS FOR SATELLITE POSITIONING SYSTEM, ABNORMAL VALUE DETECTION METHOD, AND ABNORMAL VALUE DETECTION PROGRAM

INCORPORATION BY REFERENCE

This application is based upon and claims the benefit of priority from Japanese Patent Application No. 2010-061878, filed on Mar. 18, 2010, the disclosure of which is incorporated herein in its entirety by reference.

TECHNICAL FIELD

The present invention relates to an abnormal value detection apparatus for a satellite positioning system, an abnormal value detection method, and an abnormal value detection program and in particular relates to an abnormal value detection apparatus for a satellite positioning system such as a GBAS (Ground Based Augmentation System) or the like which detects an abnormal value included in a pseudo distance calculated from a positioning signal, an abnormal value detection method, and an abnormal value detection program.

BACKGROUND ART

The satellite positioning system such as a global positioning system (GPS) or the like in which a receiver receives the positioning signal transmitted by an artificial satellite and the receiver can determine its position from the positioning signal is widely used for navigation support of a vehicle, an aircraft, a ship or the like. The receiver in this satellite positioning system calculates the distance with the artificial satellite from the positioning signal and calculates the receiver's position based on the calculated distance. The distance between the receiver and the artificial satellite that is calculated from this positioning signal is called a pseudo distance.

The satellite positioning system performs positioning calculation based on the pseudo distance between each artificial satellite and the receiver. Therefore, the precision of the calculation of this pseudo distance has a large influence on the precision of the positioning calculation. The pseudo distance includes an abnormal value generated by various causes, such as a clock error, an error based on the ionosphere, an error based on the troposphere, a noise, and the like. Therefore, it is important to remove this abnormal value appropriately for improving the precision of the positioning measurement in the satellite positioning system and improving stability when it is used.

For this reason, in the satellite positioning system, an abnormal value detection apparatus (called Integrity Monitor (IM)) which monitors a state in which the abnormal value occurs in time-series data such as the pseudo distance or the like measured sequentially is often used usually. In particular, in a system such as a ground based augmentation system (GBAS) in which the satellite positioning system is used for navigation of an aircraft, a high level of safety is required. Therefore, the abnormal value detection apparatus is indispensable for such system.

The abnormal value detection apparatus is disclosed in a document by Gang Xie titled "OPTIMAL ON-AIRPORT MONITORING OF THE INTEGRITY OF GPS-BASE LANDING SYSTEMS" Ph.D. Dissertation, Stanford University, pages 26-32, Mar. 2, 2004 (non-patent document 1). In the abnormal value detection apparatus for the satellite positioning system described in non-patent document 1, a model of a monitored phenomenon is modeled by using past data of the previous day and the days before that. In the abnormal value detection apparatus, a Gaussian distribution is assumed for each elevation angle width of 10 degrees as a model and each of the data is normalized by using a dispersion value obtained for each elevation angle width of 10 degrees. The abnormal value detection apparatus assumes that the distribution of the normalized data follows the standard Gaussian distribution and detects a value which does not follow this standard Gaussian distribution as an abnormal value.

Further, an abnormal value detection apparatus for a satellite positioning system is disclosed in Japanese Patent Application Laid-Open No. 2009-68927 (patent document 1). The abnormal value detection apparatus for a satellite positioning system described in patent document 1 compares the worst value of the difference between values of a satellite orbit position in a predetermined effective period with a threshold value and determines the value of the satellite orbit position which is the origin of the worst value as the abnormal value when the worst value exceeds the threshold value.

However, there is a case in which the abnormal value detection apparatus described in non-patent document 1 and patent document 1 can not detect the abnormal value with high precision.

Namely, the abnormal value detection apparatus described in non-patent document 1 and patent document 1 assumes an invariant model based on the data in the past. Therefore, when an observation environment changes, there is a case in which the assumed invariant model cannot follow it. In such case, the calculation result cannot be trusted.

In addition, these abnormal value detection apparatuses do not take into account a time series correlation between data in the modeling. Therefore, when there is the time series correlation between data, these abnormal value detection apparatuses cannot detect this correlation. In this case, the calculation result includes an error.

SUMMARY

The present invention is made in view of the above described situation. An example of an object of the present invention is to provide an abnormal value detection apparatus which can detect an abnormal value with high precision even when an observation environment changes or there is a time series correlation between data, an abnormal value detection method, and an abnormal value detection program.

Problems to be Solved by the Invention

In order to achieve the above-mentioned object, an abnormal value detection apparatus for a satellite positioning system according to an exemplary aspect of the present invention includes: a first probability distribution obtaining means for taking a time-series value that is a target for detection of an abnormal value in the satellite positioning system as a first random variable, calculating a first probability density function in a first period before a predetermined time based on weighted statistics of the time-series value, and obtaining the first probability density function as a first probability distribution; uncertainty index calculation means for calculating a decision content of the first random variable at time t−1 just before time t as an uncertainty index based on the first probability distribution obtained by the first probability distribution obtaining means for each time t that is a unit time in the first period; second probability distribution obtaining means for calculating an average value of the uncertainty index calculated by the uncertainty index calculation means in a second period shorter than the first period before the time t, taking the average value as a second random variable, calculating a second probability, density function in the first period based on weighted statistics of the second random variable, and obtaining the second probability density function as a second probability distribution; change point index calculation means for calculating an average information content of the second probability distribution in the second period before time t−1 just before time t at which the second probability distribution is obtained as a change point index based on the second probability distribution obtained at each time t by the second probability distribution obtaining means; and abnormal value detection means for comparing the change point index calculated by the change point index calculation means with a threshold value set in advance and detecting the time-series value corresponding to the change point index whose value is greater than the threshold value as the an abnormal value.

In order to achieve the above-mentioned object, an abnormal value detection method for a satellite positioning system according to an exemplary aspect of the present invention includes the steps of: taking a time-series value that is a target for detection of an abnormal value in the satellite positioning system as a first random variable, calculating a first probability density function in a first period before a predetermined time based on weighted statistics of the time-series value, and obtaining the first probability density function as a first probability distribution; calculating a decision content of the first random variable at time t−1 just before time t as an uncertainty index based on the first probability distribution obtained at each time t that is a unit time in the first period; calculating an average value of the uncertainty index calculated in a second period shorter than the first period before the time t; taking the average value as a second random variable, calculating a second probability density function in the first period based on the weighted statistics of the second random variable, and obtaining the second probability density function as a second probability distribution; calculating an average information content of the second probability distribution in the second period before the time t−1 just before time t at which the second probability distribution is obtained as a change point index based on the second probability distribution obtained at each time t; and comparing the calculated change point index with a threshold value set in advance and detecting the time-series value corresponding to the change point index whose value is greater than the threshold value as an abnormal value.

Moreover, in order to achieve the above-mentioned object, an abnormal value detection program for a satellite positioning system according to an exemplary aspect of the present invention which causes a computer to to perform: a process of taking a time-series value that is a target for detection of an abnormal value in the satellite positioning system as a first random variable, calculating a first probability density function in a first period before a predetermined time based on weighted statistics of the time series-value, and obtaining the first probability density function as a first probability distribution; a process of calculating a decision content of the first random variable at time t−1 just before time t as an uncertainty index based on the first probability distribution obtained at each time t that is a unit time in the first period; a process of calculating an average value of the uncertainty index calculated in a second period shorter than the first period before the time t; a process of taking the calculated average value as a second random variable, calculating a second probability density function in the first period based on weighted statistics of the second random variable, and obtaining the second probability density function as a second probability distribution; a process of calculating an average information content of the second probability distribution in the second period before the time t−1 just before time t at which the second probability distribution is obtained as a change point index based on the second probability distribution obtained at each time t; and a process of comparing the calculated change point index with a threshold value set in advance and detecting the time series-value corresponding to the change point index whose value is greater than the threshold value as the abnormal value.

In the present invention, the time-series value is taken as the random variable, the first probability density function is obtained, the average value of the uncertainty index that are the decision contents calculated from the first probability density function is taken as the random variable and the second probability density function is calculated. Additionally, the change point index that is the average information content of the second probability density function is calculated and the time-series value corresponding to the change point index whose value is greater than the threshold value is detected as an abnormal value. Therefore, the present invention can detect the abnormal value with high precision even when there is the time series correlation between data or the observation environment changes.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment of the present invention will be described with reference to the drawings.

Figure 1:
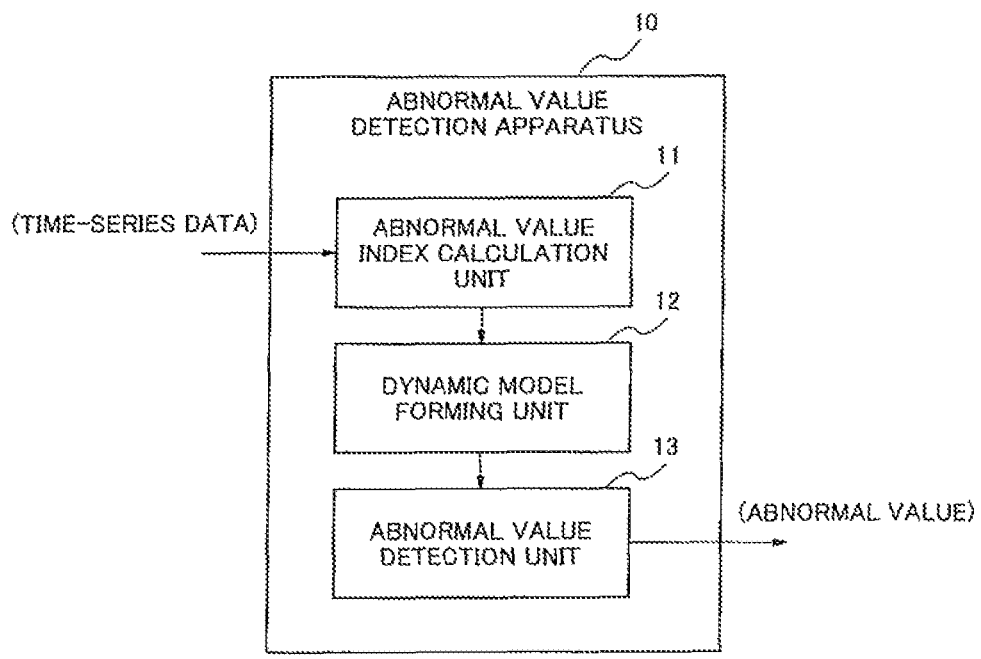
FIG. 1 is a block diagram showing one exemplary embodiment of an abnormal value detection apparatus in a satellite positioning system of the present invention.

FIG. 1 is a block diagram showing one exemplary embodiment of an abnormal value detection apparatus for a satellite positioning system of the present invention. As shown in FIG. 1, an abnormal value detection apparatus 10 of this exemplary embodiment includes an abnormal value index calculation unit 11, a dynamic model forming unit 12, and an abnormal value detection unit 13, monitors the inputted time-series data, and detects an abnormal value in the satellite positioning system.

The abnormal value index calculation unit 11 receives time-series data and calculates an abnormal value index at each time of the time-series data. The time-series data is data such as a pseudo distance between each artificial satellite and a receiver in the satellite positioning system, a phase of a received positioning signal, or the like that is obtained in time series based on a positioning signal from an artificial satellite in a receiver. The abnormal value index is a time-series value that is a target for detection of an abnormal value. Here, the abnormal value index is the pseudo distance, acceleration of the phase, or the like and a value that sharply responds to an abnormality to be detected. This abnormal value index corresponds to the time-series value of the present invention that is a target for detection of an abnormal value in the satellite positioning system.

The dynamic model forming unit 12 dynamically forms a model from the abnormal value index obtained in time series by using the abnormal value index calculation unit 11 in a predetermined period. Additionally, the dynamic model forming unit 12 calculates a change point index from the abnormal value index in time series based on the formed dynamic model. The change point index is an index for determining whether the time-series value is a one-shot outlier from a dynamic model or the dynamic model itself of input data changes when the time-series value which suddenly increases and decreases exists. In this exemplary embodiment, the higher the possibility that the time-series value is the outlier from the dynamic model becomes, the larger the value of the change point index becomes. Therefore, when the change point index whose value is greater than a certain threshold value is calculated, the time is handled as the abnormal value.

Figure 2:
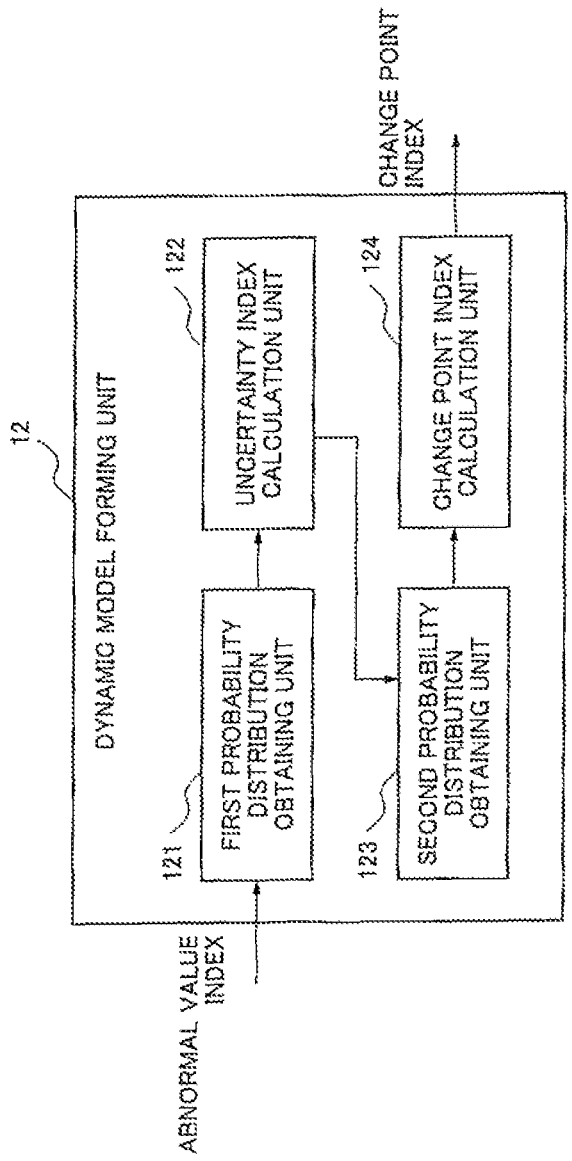
FIG. 2 is a block diagram showing one exemplary embodiment of a dynamic model forming unit in FIG. 1.

FIG. 2 is a block diagram of an exemplary embodiment of the dynamic model forming unit 12. As shown in FIG. 2, the dynamic model forming unit 12 includes a first probability distribution obtaining unit 121, an uncertainty index calculation unit 122, a second probability distribution obtaining unit 123, and a change point index calculation unit 124.

The first probability distribution obtaining unit 121 takes a time-series value (that is, an abnormal value index) that is a target for detection of the abnormal value in the satellite positioning system as a first random variable, calculates a first probability density function in a first period before a predetermined time based on weighted statistics of the abnormal value index, and obtains it as a first probability distribution.

The uncertainty index calculation unit 122 calculates a decision content of the first random variable corresponding to time t−1 just before time t as an uncertainty index based on the first probability distribution obtained by the first probability distribution obtaining unit 121 at each time t that is a unit time in the first period.

The second probability distribution obtaining unit 123 takes a period shorter than the first period as a second period for each time t and calculates an average value of the uncertainty index calculated by using the uncertainty index calculation unit 122 in the second period before the time t. The second probability distribution obtaining unit 123 takes the average value as a second random variable, calculates a second probability density function in the first period based on weighted statistics of the second random variable, and obtaining it as a second probability distribution.

The change point index calculation unit 124 calculates an average information content of the second probability distribution (that is, the second probability density function) in the second period before the time t−1 just before time t at which the second probability distribution is obtained as a change point index based on the second probability distribution obtained at each time t by using the second probability distribution obtaining means 123. In the calculation of this change point index, the dynamic model forming unit 12 introduces a time series model for the population for the calculation. Therefore, the dynamic model forming unit 12 can reflect a time series behavior of the abnormal value index in the calculation of the change point index.

The abnormal value detection unit 13 shown in FIG. 1 compares the change point index calculated at each time t based on the dynamic model forming unit 12 with a threshold value set in advance and when the value of the change point index is greater than the threshold value, the abnormal value detection unit 13 detects the abnormal value index (time-series value) corresponding to the change point index at the time as the abnormal value.

Next, operation of the abnormal value detection apparatus 10 of this exemplary embodiment shown in FIG. 1 and FIG. 2 will be described in detail with reference to a flowchart in FIG. 3 and the like.

First, the abnormal value detection apparatus 10 calculates the abnormal value index at each time from the inputted time-series data by using the abnormal value index calculation unit 11 (Step S1). Next, by using the first probability distribution obtaining unit 121, the abnormal value detection apparatus 10 takes the abnormal value index calculated in step S1 as the first random variable and obtains a first probability density function $p(x_t)$ of the first random variable in a predetermined first period T1 before the current time by using the following equation (Step S2).

[Equation 1]

$$p(x_t) = \frac{1}{\sqrt{2\pi}\, \sigma 1_{t-1}} \exp\left(-\frac{1}{2} \frac{(x_t - w1_{t-1})^2}{\sigma 1_{t-1}^2}\right) \quad (1)$$

In the equation 1, t is a time at which each abnormal value index (first random variable) has been calculated and $x_t$ is a value of the abnormal value index (first random variable) at the time t. Further, in the equation 1, $w1_{t-1}$ is a weighted average value of the abnormal value index (first random variable) $x_t$ in a period before the time t−1 in the period T1. The weighted average value $w1_{t-1}$ is an average value of the abnormal value index (first random variable) $x_t$ in which a larger weighting value is given to nearer the present time. Further, in the equation 1, $\sigma 1_{t-1}$ is a weighted variance value of the abnormal value index (first random variable) $x_t$ in the period before the time t−1 in the period T1. The weighted variance value $\sigma 1_{t-1}$ is a variance value of the abnormal value index (first random variable) $x_t$ in which a larger weighting value is given to nearer the present time.

Next, by using the uncertainty index calculation unit 122, the abnormal value detection apparatus 10 calculates an uncertainty index ULI(t) at each time t after t=2 based on the first probability density function at the time t−1 inputted from the first probability distribution obtaining unit 121 by using the following equation (Step S3).

[Equation 2]

$$ULI(t) = -\log(p_{t-1}(x_t|x^{t-1})) \quad (2)$$

From the equation 2, the uncertainty index ULI(t) at the time t is the decision content of the abnormal value index at the time t−1 just before time t. In the right side of the equation 2, $p_{t-1}(x_t|x_{t-1})$ is the first probability density function calculated by the equation 1 at the time t−1.

Namely, $p_{t-1}(x_t|x_{t-1})$ is the probability density distribution which is represented by a parameter $\theta_{t-1}$ estimated based on $x_{t-1}$ (=$x_1, x_2, \ldots,$ and $x_{t-1}$; data from time 1 to time t−1). In other words, $p_{t-1}(x_t|x_{t-1})=p_{t-1}(x_t|\theta_{t-1})$. Incidentally, $\theta_{t-1}=$ ($w1_{t-1}, \sigma1_{t-1}$). The right side of the equation 2 means that a minus value of the logarithm of the probability density function $p_{t-1}(x_1|x_{t-1})$ at the time t−1, that is the decision content, is calculated at each time t.

Next, by using the second probability distribution obtaining unit 123, the abnormal value detection apparatus 10 calculates an average value $y_t$ of the uncertainty index in a period T2 before the time t at each time t based on the uncertainty index ULI(t) calculated by using the uncertainty index calculation unit 122 by using the following equation (Step S4). Here, the length of the period T2 is set shorter than that of the period T1.

[Equation 3]

$$y_t = \frac{1}{T2} \sum_{i=t-T2+1}^{t} ULI(i) \quad (3)$$

In the equation 3, ULI(i) shows the uncertainty index corresponding to time i.

Next, the second probability distribution obtaining unit 123 takes the average value $y_t$ of the uncertainty index as the second random variable and calculates a second probability density function $q(y_t)$ of the random variable in a period T3 before the time t based on the following equation (Step S5). This second probability density function $q(y_t)$ is obtained as the second probability distribution. Here, the length of the period T3 is set shorter than or equal to that of the period T1.

[Equation 4]

$$q(y_t) = \frac{1}{\sqrt{2\pi}\, \sigma 2_{t-1}} \exp\left(-\frac{1}{2}\frac{(y_t - w2_{t-1})^2}{\sigma 2_{t-1}^2}\right) \quad (4)$$

In the equation 4, $w2_{t-1}$ is the weighted average value of the second random variable (average value of the uncertainty index) $y_t$ in a period before the time t−1 in the period T3. This weighted average value $w2_{t-1}$ is an average value of $y_t$ in which a larger weighting value is given to nearer the present time. Further, in the equation 4, $\sigma 2_{t-1}$ is a weighted variance value of the second random variable (average value of the uncertainty index) $y_t$ in the period before the time t−1 in the period T3. The weighted variance value $\sigma 2_{t-1}$ is a variance value of $y_t$ in which a larger weighting value is given to nearer the present time.

Next, by using the change point index calculation unit 124, the abnormal value detection apparatus 10 calculates a change point index CPI(t) at each time t based on the second probability density function calculated by using the second probability distribution obtaining unit 123 by using the following equation (Step S6).

[Equation 5]

$$CPI(t) = \frac{1}{14} \sum_{i=t-T4+1}^{t} (-\log(q_{i-1}(y_i|y^{i-1}))).$$

In the equation 5, a period T4 is a period before the time t−1 and $q_{i-1}(y_i|y_{i-1})$ is the second probability density function (second probability distribution) at the time i. The right side of the equation 5 means that an average value of minus values of the logarithm of the second probability density function $q_{i-1}(y_i|y_{i-1})$ of the period T4 before the time t−1, that is the average information content, is calculated at each time t. Here, the length of the period T4 is set shorter than that of the period T1. In this exemplary embodiment, the length of the period T4 is set shorter than or equal to that of the period T2.

In the abnormal value detection apparatus 10, the shorter the length of the periods T2 and T4 become, the smaller the amount of calculation becomes and whereby the abnormal value detection apparatus 10 can quickly calculate the change point index. However, a rate of erroneous detection in the abnormal value detection becomes high. On the other hand, the longer the length of the periods T2 and T4 becomes, the larger the amount of calculation becomes and whereby the calculation of the change point index requires much time. However, the abnormal value detection apparatus 10 can detect the abnormal value with high precision. Consequently, the length of the periods T2 and T4 is determined in consideration of a balance between the speed of the calculation of the change point index (this corresponds to the speed of the detection of the abnormal value) and the precision of the detection of the abnormal value.

Finally, by using the abnormal value detection unit 13, the abnormal value detection apparatus 10 compares the change point index calculated by the change point index calculation unit 124 with a threshold value set in advance for each time and when the value of the change point index is greater than the threshold value, the abnormal value detection apparatus 10 detects the abnormal value index at the time as the abnormal value (Step S7).

Further, the above-mentioned periods T1 and T3 correspond to the first period in the present invention and the above-mentioned periods T2 and T4 correspond to the second period in the present invention.

In the present invention, the period T3 in the exemplary embodiment correspond to the first period in the present invention. However, the period T3 may correspond to the third period in the present invention. Further, in the present invention, the period T4 in the exemplary embodiment correspond to the second period in the present invention. However, the period T4 may correspond to the fourth period in the present invention.

Figure 4:
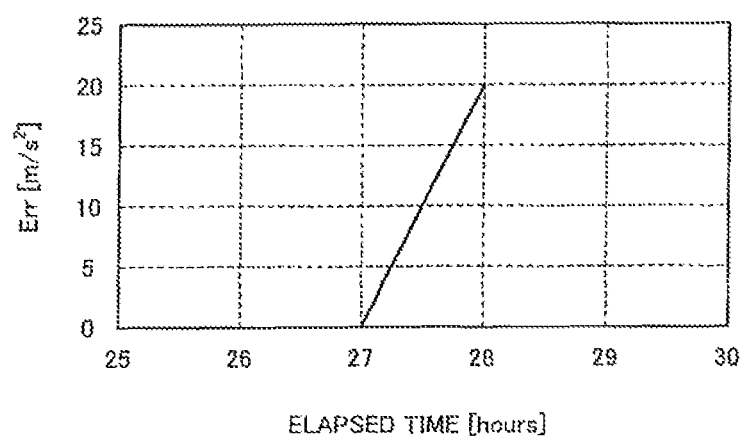
FIG. 4 is a view showing one example of a value of an abnormal value that is intentionally mixed in time-series data of an acceleration value observed in time series and a time at which the abnormal value is mixed.
Figure 5:
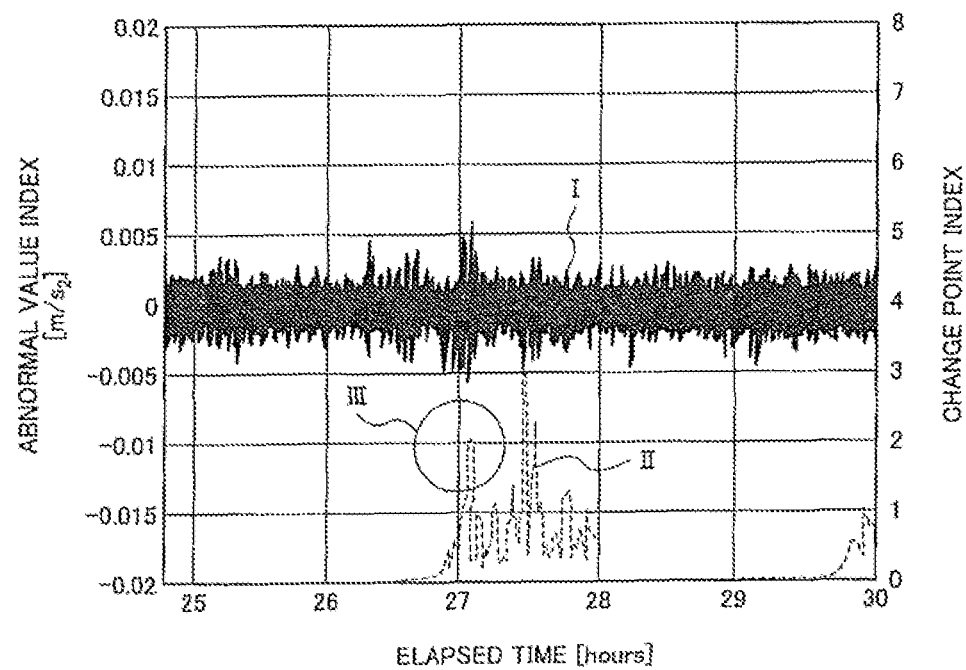
FIG. 5 is a view showing a result of detection of the abnormal value of time-series data of the acceleration value in which the abnormal value shown in FIG. 4 is intentionally mixed based on the abnormal value detection apparatus shown in FIG. 1.

Next, one example of the result of detection of the abnormal value by the abnormal value detection apparatus 10 will be described with reference to FIG. 4 and FIG. 5. In FIG. 4 and FIG. 5, the acceleration of the inputted phase is taken as the abnormal value index. Here, an amount of natural change in acceleration based on the orbit movement of the artificial satellite is eliminated in advance.

FIG. 4 is a view showing one example of a value of an abnormal value that is intentionally mixed in the time-series data of an acceleration value observed in time series and a time at which the abnormal value is mixed. In FIG. 4, the vertical axis indicates the value of the abnormal value that is intentionally mixed and the horizontal axis indicates the elapsed time from the performance simulation start time. As shown by a slant line in FIG. 4, the abnormal value is intentionally mixed in a period from a time at which 27 hours has passed from a reference time to a time at which 28 hours has passed from the reference time so that the value of the abnormal value that is mixed is gradually increased with the elapsed time.

FIG. 5 is a view showing a result of detection of the abnormal value of time-series data of the acceleration value in which the abnormal value is intentionally mixed as shown in FIG. 4 based on the abnormal value detection apparatus 10 of the exemplary embodiment. In FIG. 5, the vertical axis on the left side indicates the abnormal value index, the vertical axis on the right side indicates the change point index, and the horizontal axis indicates a time at which the time-series data of the acceleration value is obtained. In FIG. 5, a portion I indicates the time variation of an abnormal value conversion index based on the abnormal value detection apparatus 10 of the exemplary embodiment and a portion II indicates the time variation of the change point index.

As shown in FIG. 5, the abnormal value detection apparatus 10 of the exemplary embodiment calculates the change point index with a relatively high value that is more than the threshold value (for example, "1.5") in a period shown by a circle III. In the period shown by the circle III 27 hours has passed from the reference time and this period is the same as the period in which the abnormal value is intentionally mixed in the time-series data of the acceleration value as shown in FIG. 4. On the other hand, as shown in FIG. 4, the abnormal value is not mixed in the time-series data in a period from the reference time to a time at which 27 hours has passed and a period after a time at which 28 hours has passed. In these periods, the change point index obtained based on the abnormal value detection apparatus 10 of the exemplary embodiment is smaller than or equal to the threshold value as shown in the portion II in FIG. 5 and no abnormal value is detected. Accordingly, it is clear that only the abnormal value that is mixed in the time-series data can be detected with high precision based on the abnormal value detection apparatus 10 of the exemplary embodiment.

As described above, the abnormal value detection apparatus 10 of the exemplary embodiment has an effect in which the abnormal value can be detected with high precision even when there is a time series correlation between data or an observation environment changes.

The reason is as follows.

The abnormal value detection apparatus 10 of the exemplary embodiment takes the time-series value as the random variable and calculates the first probability density function in accordance with the latest observation environment by using the weighted average value $w1_{t-1}$ and the weighted variance value $\sigma1_{t-1}$ in which a larger weighting value is given to nearer the present time. Next, the abnormal value detection apparatus 10 calculates the uncertainty index that is the decision content from the first probability density function. Further, the abnormal value detection apparatus 10 takes the average value of the uncertainty index as the random variable and calculates the second probability density function in accordance with the latest observation environment by using the weighted average value $w2_{t-1}$ and the weighted variance value $\sigma2_{t-1}$ in which a larger weighting value is given to nearer the present time. The abnormal value detection apparatus 10 calculates the change point index that is the average information content from the second probability density function and detects the time-series value corresponding to the change point index whose value is greater than the threshold value as the abnormal value.

By employing the above-mentioned configuration, the abnormal value detection apparatus 10 can detect the time series correlation which cannot be detected by the calculation of the first probability density function based on the calculation of the second probability density function. Additionally, the abnormal value detection apparatus 10 can detect the change in observation environment which cannot be detected by the calculation of the first probability density function based on the calculation of the second probability density function. Therefore, the abnormal value detection apparatus 10 can detect the abnormal value with high precision even when there is the time series correlation between data or the observation environment changes.

EXAMPLE 1

Figure 6:
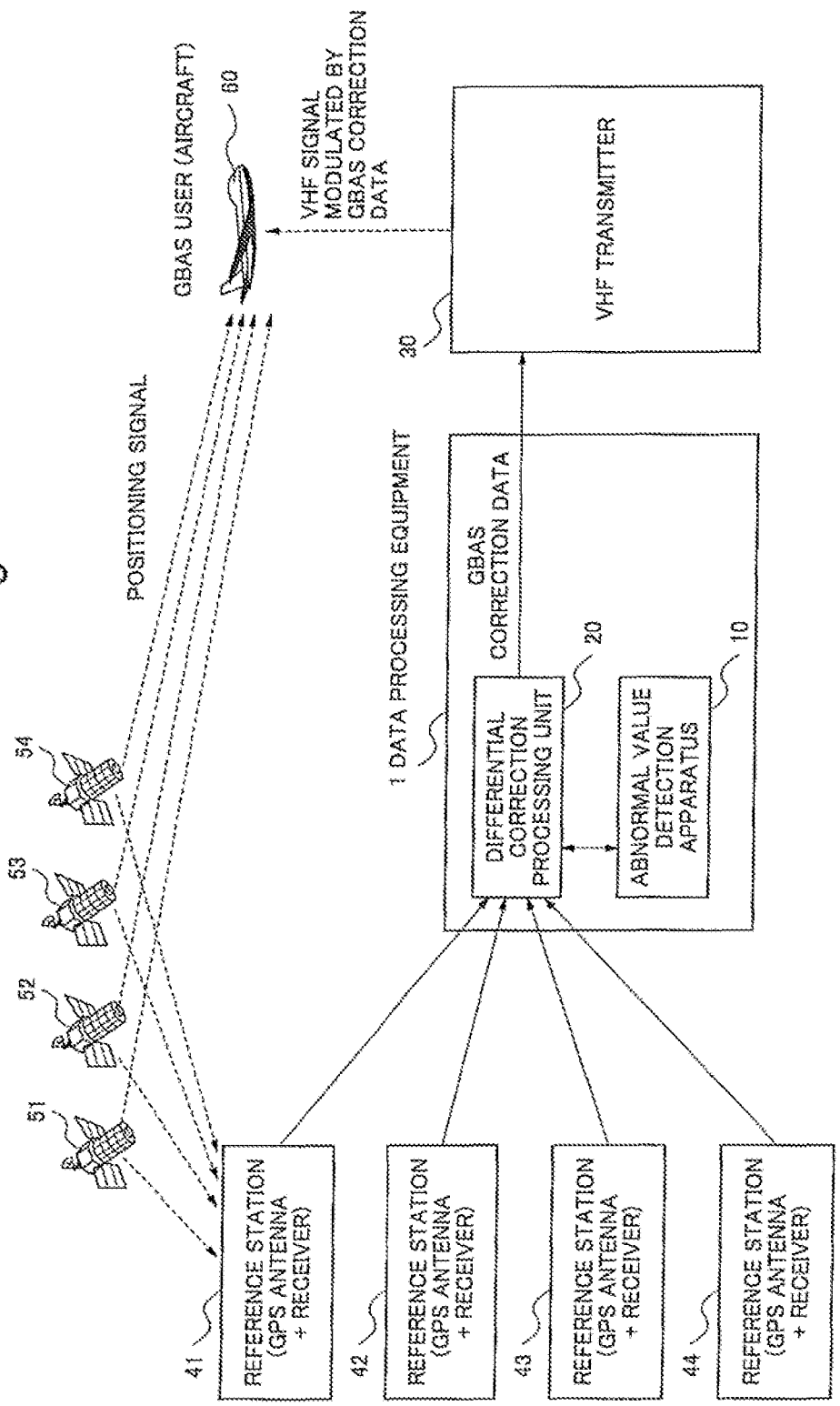
FIG. 6 is a figure showing a system configuration of one example of a ground based augmentation system (GBAS) to which an abnormal value detection apparatus for a satellite positioning system of the present invention is applied.

FIG. 6 is a figure showing a system configuration of one example of a ground based augmentation system (GBAS) to which an abnormal value detection apparatus according to the present invention is applied. In FIG. 6, the GBAS of this example that is a satellite positioning system includes a data processing equipment 1, a VHF (very high frequency) transmitter 30, reference stations 41 to 44, artificial satellites (GPS satellites) 51 to 54 of which the GPS is composed, and a GBAS user (aircraft) 60.

A GBAS ground station includes the data processing equipment 1, the VHF transmitter 30, and the reference stations 41 to 44. The data processing equipment 1 includes the abnormal value detection apparatus 10 of the exemplary embodiment and also includes a differential correction processing unit 20.

The reference stations 41 to 44 receive a positioning signal transmitted by the GPS satellites 51 to 54 or the like and output the GPS observation data that is the received signal to the differential correction processing unit 20 in the data processing equipment 1. The differential correction processing unit 20 generates the time-series data that is a statistical information content that is processed for input of the abnormal value detection apparatus 10 based on the GPS observation data and supplies it to the abnormal value detection apparatus 10.

The abnormal value detection apparatus 10 performs the above-mentioned operation of the exemplary embodiment and when the abnormal value detection apparatus 10 detects the abnormal value, it outputs the detected abnormal value to the differential correction processing unit 20. When the differential correction processing unit 20 receives the abnormal value, it inhibits the concerned GPS satellite or reference station from being used. When the abnormal value is not received, the differential correction processing unit 20 generates GBAS correction data for improving precision and safety of navigation based on the GPS by employing a publicly known method by using the combination of all the GPS satellites 51 to 54 and the reference stations 41 to 44 and supplies it to the VHS transmitter 30. The VHS transmitter 30 transmits a VHS signal which is modulated by the inputted GBAS correction data.

The aircraft 60 that is the GBAS user loads a GPS receiver (not shown) which receives the positioning signal transmitted by the GPS satellites 51 to 54 and obtains position information and a receiver (not shown) which receives the VHS signal modulated by the GBAS correction data that is transmitted by the VHF transmitter 30 The aircraft 60 ensures safe of navigation by using the predetermined information obtained from the reception signal of the GPS receiver and the GBAS correction data that is demodulated from the reception signal of the receiver for the VHS signal for landing guidance or the like based on a publicly known method.

Based on operates as mentioned above, the abnormal value detection apparatus according to the present invention that is applied to the ground based augmentation system of this example has an effect in which the abnormal value can be detected with high precision even when there is the time series correlation between data or the observation environment changes.

That is because the abnormal value detection apparatus can detect the time series correlation which cannot be detected by the calculation of the first probability density function based on the calculation of the second probability density function. Additionally, the abnormal value detection apparatus can detect the change in observation environment which cannot be detected by the calculation of the first probability density function based on the calculation of the second probability density function. Therefore, the abnormal value detection apparatus can detect the abnormal value with high precision even when there is the time series correlation between data or the observation environment changes.

Further, the present invention is not limited to the above mentioned exemplary embodiment and example. The abnormal value detection apparatus 10 of the exemplary embodiment obtains the probability distribution (probability density function) twice by using the equation 1 and the equation 4. However, for example, the abnormal value detection apparatus 10 of the exemplary embodiment may take the value calculated by the equation 4 as the random variable, further obtain the probability density function based on the weighted statistics of the random variable, calculate an inflection point index from the probability density function, and detect the abnormal value based on a result of the comparison between the inflection point index and the threshold value.

Further, the configuration of the abnormal value detection apparatus according to the exemplary embodiment of the present invention is not limited to above-mentioned one. The abnormal value detection apparatus according to the exemplary embodiment of the present invention may have a configuration that is the same as that of an abnormal value detection apparatus 15 shown in FIG. 7.

Figure 7:
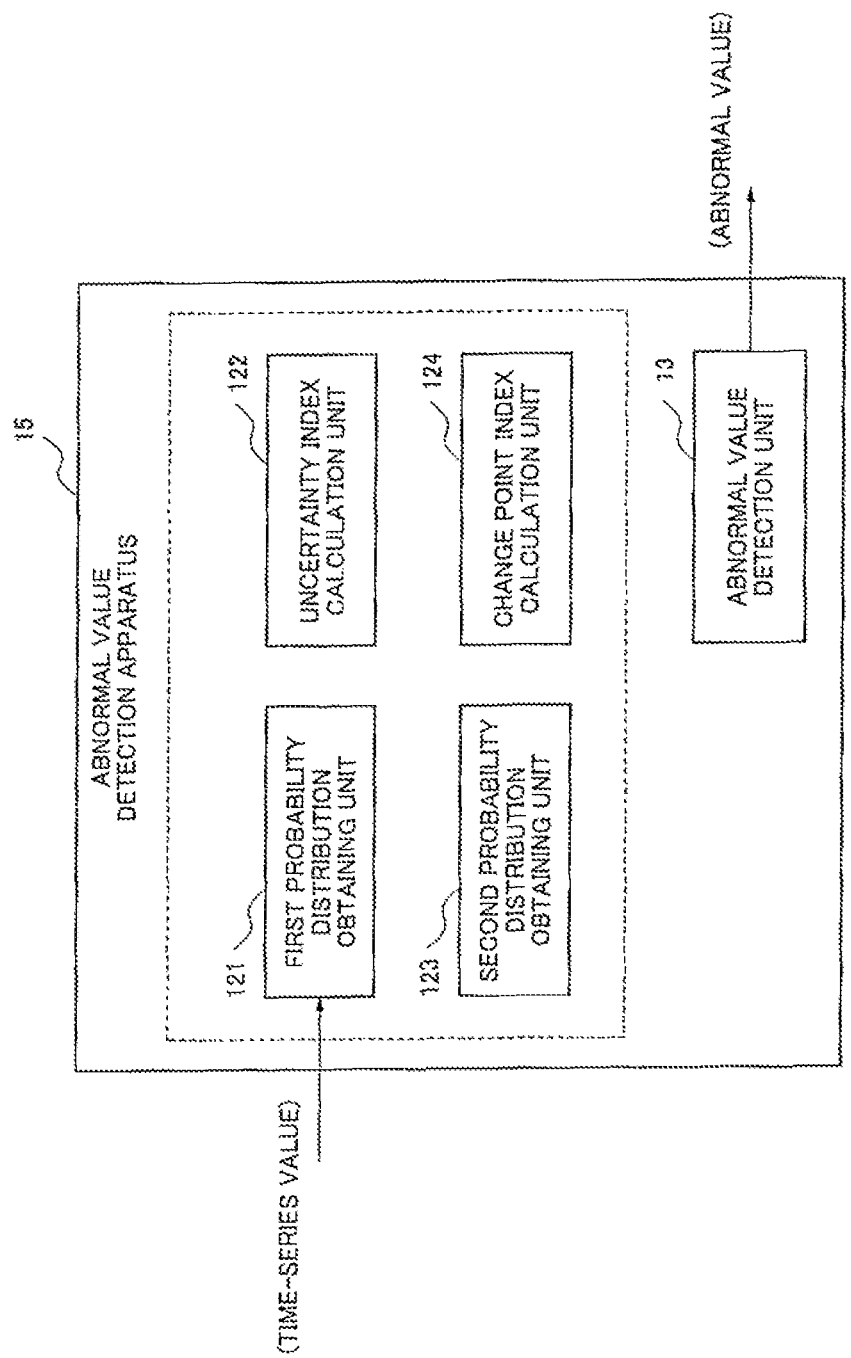
FIG. 7 is a block diagram showing another configuration of an exemplary embodiment of an abnormal value detection apparatus for a satellite positioning system of the present invention.

The abnormal value detection apparatus 15 shown in FIG. 7 includes the first probability distribution obtaining unit 121, the uncertainty index calculation unit 122, the second probability distribution obtaining unit 123, the change point index calculation unit 124, and the abnormal value detection unit 13 and has a minimum configuration of this exemplary embodiment.

The abnormal value detection apparatus 15 receives the time-series data (time-series value) of the abnormal value index that is a target for detection of an abnormal value, for example the pseudo distance of the satellite and the time-series data of the acceleration calculated from the phase, from an apparatus (not shown) and can detect the abnormal value like the abnormal value detection apparatus 10.

Figure 3:
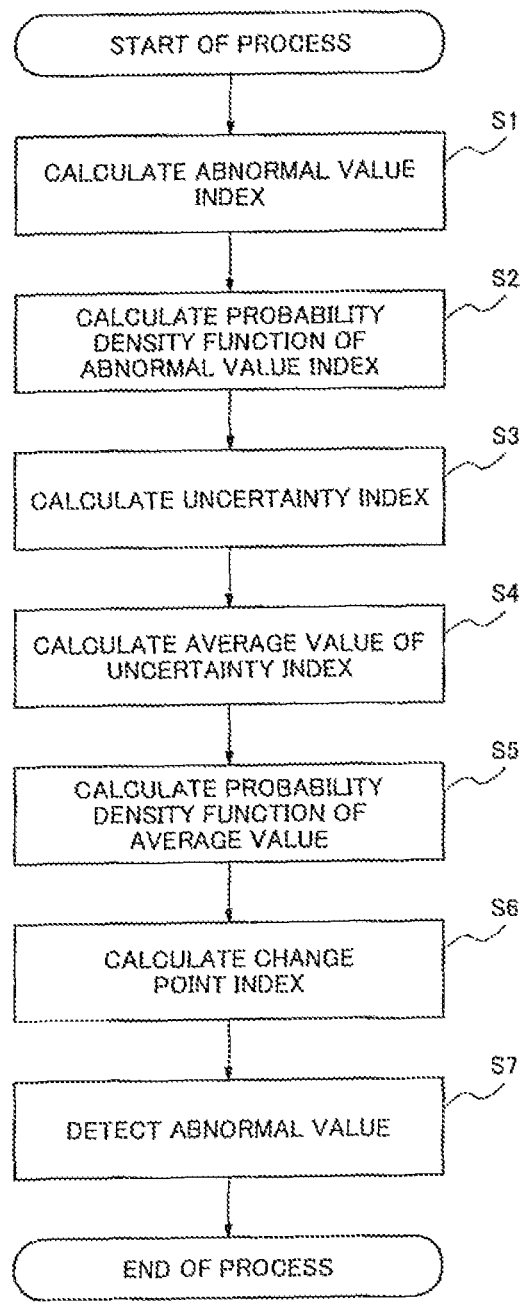
FIG. 3 is a flowchart showing one exemplary embodiment of operation of an abnormal value detection apparatus in a satellite positioning system of the present invention.
Figure 8:
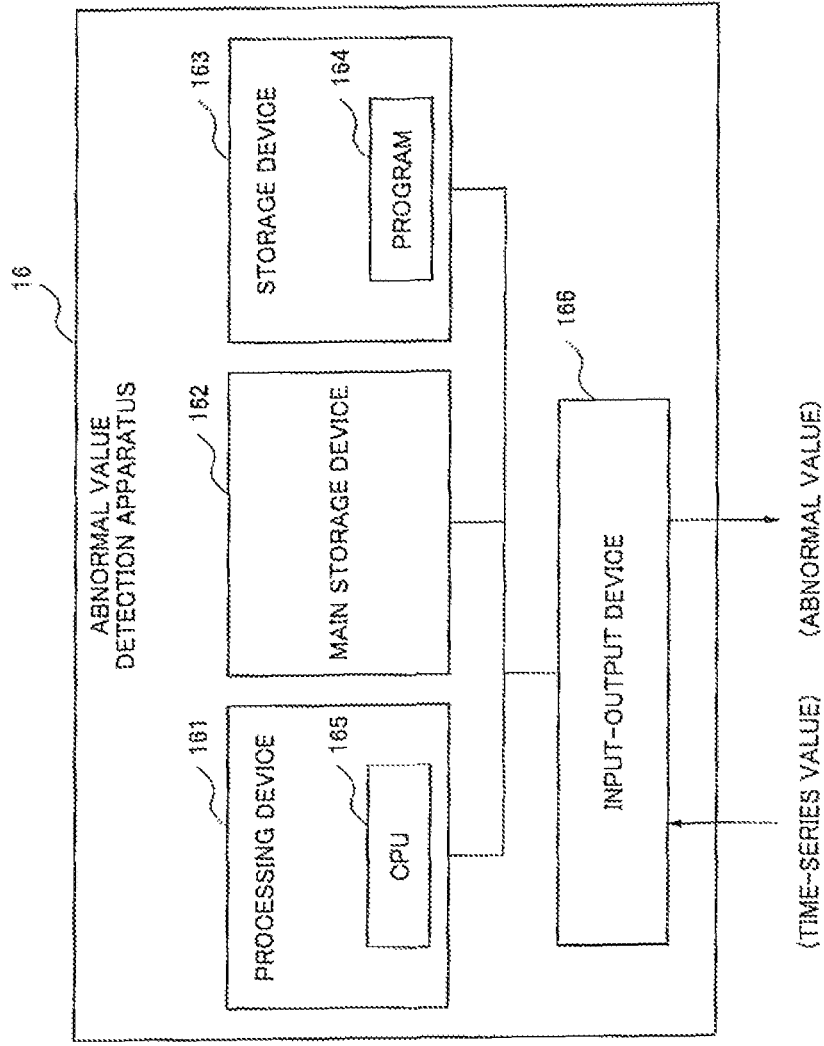
FIG. 8 is a block diagram showing another configuration of an exemplary embodiment of an abnormal value detection apparatus for a satellite positioning system of the present invention.

As shown in FIG. 8, the present invention may include an abnormal value detection program 164 which causes a central processing unit (CPU) 165 that is a computer to execute all or a part of steps of a flowchart shown in FIG. 3. In this case, an abnormal value detection apparatus 16 includes a processing device 161, a main storage device 162, and a storage device 163 storing the abnormal value detection program 164 of the present invention and executes the abnormal value detection program 164 by using the processing device 161 and the main storage device 162. The abnormal value detection apparatus 16 realizes all or a part of steps of the flowchart shown in FIG. 3 based on such operation. Here, the processing device 161 includes the CPU 165 which executes the process according to the abnormal value detection program 164. The main storage device 162 holds data required for the process described in the flowchart shown in FIG. 3, data calculated in the step of the calculation process based on the processing device 161, and a result of the calculation process. Further, the abnormal value detection apparatus 16 receives the time-series value via an input-output device 166 and transmits the abnormal value.

Additionally, each component of the abnormal value detection apparatus 16 may include a storage medium for storing the program executed by the computer.

Moreover, the present invention can be applied to another publicly known satellite positioning system other than the GBAS when it is a satellite positioning system using the positioning signal from an artificial satellite.

The whole or part of the exemplary embodiments disclosed above can be described as, but not limited to, the following supplementary notes.

(Supplementary Note 1)

An abnormal value detection apparatus for a satellite positioning system comprising:

first probability distribution obtaining means for taking a time-series value that is a target for detection of an abnormal value in the satellite positioning system as a first random variable, calculating a first probability density function in a first period before a predetermined time based on weighted statistics of the time-series value, and obtaining the first probability density function as a first probability distribution;

uncertainty index calculation means for calculating a decision content of the first random variable at time t−1 just before time t as an uncertainty index based on the first probability distribution obtained by the first probability distribution obtaining means at each time t that is a unit time in the first period;

second probability distribution obtaining means for calculating an average value of the uncertainty index calculated by the uncertainty index calculation means in a second period shorter than the first period before the time t, taking the average value as a second random variable, calculating a second probability density function in the first period based on weighted statistics of the second random variable, and obtaining the second probability density function as a second probability distribution;

change point index calculation means for calculating an average information content of the second probability distribution in the second period before the time t−1 just before time t at which the second probability distribution is obtained as a change point index based on the second probability distribution obtained at each time t by the second probability distribution obtaining means; and abnormal value detection means for comparing the change point index calculated by the change point index calculation means with a threshold value set in advance and detecting the time-series value corresponding to the change point index whose value is greater than the threshold value as the abnormal value.

(Supplementary Note 2)

The abnormal value detection apparatus for the satellite positioning system described in supplementary note 1 characterized in that:

the second probability distribution obtaining means calculate an average value of the uncertainty index in the second period, taking the average value as the second random variable, calculate the second probability density function in a third period whose length is shorter than or equal to that of the first period based on weighted statistics of the second random variable, and obtain the second probability density function as the second probability distribution; and the change point index calculation means calculate the average information content of the second probability distribution in a fourth period whose length is shorter than or equal to that of the second period before the time t−1 based on the second probability distribution corresponding to the time t−1 as the change point index.

(Supplementary Note 3)

The abnormal value detection apparatus for the satellite positioning system described in supplementary note 1 or supplementary note 2 characterized in that:

the time-series value is data including a pseudo distance between each artificial satellite and a receiver in the satellite positioning system or a phase of a positioning signal that is obtained in time series based on the positioning signal from the artificial satellite that is received by the receiver.

(Supplementary Note 4)

The abnormal value detection apparatus for the satellite positioning system described in any one of supplementary notes 1 to 3 characterized in that:

the first probability distribution obtaining means obtain a first probability density function $p(x_t)$ as the first probability distribution by using the following equation 6, where $x_t$ is the first random variable at the time t, $w1_{t-1}$ is a weighted average value of the first random variable $x_t$ in which a larger weighting value is given to the newer time-series value in a period before the time t−1 in the first period, and $\sigma 1_{t-1}$ is a weighted variance value of the first random variable $x_t$ in which a larger weighting value is given to the newer time-series value in a period before the time t−1 in the first period.

$$p(x_t) = \frac{1}{\sqrt{2\pi}\,\sigma 1_{t-1}} \exp\left(-\frac{1}{2}\frac{(x_t - w1_{t-1})^2}{\sigma 1_{t-1}^2}\right) \quad \text{[Equation 6]}$$

(Supplementary Note 5)

The abnormal value detection apparatus for the satellite positioning system described in any one of supplementary notes 1 to 4 characterized in that:

the uncertainty index calculation means calculate ULI(t) as the uncertainty index at the time t by using the following equation 7, where $x_t$ is the first random variable at the time t and $p_{t-1}(x_t|x_{t-1})$ is the first probability density function at the time t−1.

$$ULI(t) = -\log(p_{t-1}(x_t|x^{t-1})) \quad \text{[Equation 7]}$$

(Supplementary Note 6)

The abnormal value detection apparatus for the satellite positioning system described in any one of supplementary notes 1 to 5 characterized in that:

the second probability distribution obtaining means calculate the second random variable $y_t$ that is an average value of the uncertainty index in the second period before the time t by using the following equation 8, where T2 is the second period and ULI(i) is the uncertainty index corresponding to a time i and $$y_t = \frac{1}{T2}\sum_{i=t-T2+1}^{t} ULI(i) \quad \text{[Equation 8]}$$

further obtain the second probability density function $q(y_t)$ as the second probability distribution by using the following equation 9, where $w2_{t-1}$ is a weighted average value of the second random variable $y_t$ in which a larger weighting value is given to the newer time-series value in a period before the time t−1 in the first period and $\sigma 2_{t-1}$ is a weighted variance value of the second random variable $y_t$ in which a larger weighting value is given to the newer time-series value in a period before the time t−1 in the first period.

$$q(y_t) = \frac{1}{\sqrt{2\pi}\,\sigma 2_{t-1}} \exp\left(-\frac{1}{2}\frac{(y_t - w2_{t-1})^2}{\sigma 2_{t-1}^2}\right) \quad \text{[Equation 9]}$$

(Supplementary Note 7)

The abnormal value detection apparatus for the satellite positioning system described in supplementary note 2 or supplementary note 6 characterized in that:

the change point index calculation means calculate CPI(t) as the change point index at the time t by using the following equation 10, where T4 is the fourth period before the time t−1 and $q_{i-1}(y_i|y_{i-1})$ is the second probability density function at the time i.

$$CPI(t) = \frac{1}{T4}\sum_{i=t-T4+1}^{t} (-\log(q_{i-1}(y_i|y^{i-1})))$$

(Supplementary Note 8)

The abnormal value detection apparatus for the satellite positioning system described in supplementary note 1 characterized in that:

the second probability distribution obtaining means further include calculation means for taking the second probability distribution obtained at each time t as a random variable and calculating a third probability density function based on weighted statistics of the random variable;

the change point index calculation means calculate an inflection point index from the third probability density function; and the abnormal value detection means compare the inflection point index with a threshold value set in advance and detect the time-series value corresponding to the inflection point index whose value is greater than the threshold value as, the abnormal value.

(Supplementary Note 9)

An abnormal value detection method for a satellite positioning system including the steps of:

taking a time-series value that is a target for detection of an abnormal value in the satellite positioning system as a first random variable, calculating a first probability density function in a first period before a predetermined time based on weighted statistics of the time-series value, and obtaining the first probability density function as a first probability distribution;

calculating a decision content of the first random variable at time t−1 just before time t as an uncertainty index based on the first probability distribution obtained at each time t that is a unit time in the first period;

calculating an average value of the uncertainty index calculated in a second period shorter than the first period before the time t;

taking the calculated average value as a second random variable, calculating a second probability density function in the first period based on weighted statistics of the second random variable, and obtaining the second probability density function as a second probability distribution;

calculating an average information content of the second probability distribution in the second period before the time t−1 just before time t at which the second probability distribution is obtained as a change point index based on the second probability distribution obtained at each time t; and comparing the calculated change point index with a threshold value set in advance and detecting the time-series value corresponding to the change point index whose value is greater than the threshold value as the abnormal value.

(Supplementary Note 10)

The abnormal value detection method for the satellite positioning system described in supplementary note 9 characterized by including the steps of:

taking the average value as the second random variable, calculating the second probability density function in a third period whose length is shorter than or equal to that of the first period based on weighted statistics of the second random variable, and obtaining the second probability density function as the second probability distribution, and calculating an average information content of the second probability distribution in a fourth period whose length is shorter than or equal to that of the second period before the time t−1 based on the second probability distribution corresponding to the time t−1 as the change point index.

(Supplementary Note 11)

The abnormal value detection method for the satellite positioning system described in supplementary note 9 or supplementary note 10 characterized in that:

the time-series value is data including a pseudo distance between each artificial satellite and a receiver in the satellite positioning system or a phase of a positioning signal that is obtained in time series based on the positioning signal from the artificial satellite that is received by the receiver.

(Supplementary Note 12)

The abnormal value detection method for the satellite positioning system described in any one of supplementary notes 9 to 11 characterized by including the step of:

obtaining the first probability density function $p(x_t)$ as the first probability distribution by using the following equation 11, where $x_t$ is the first random variable at the time t, $w1_{t-1}$ is a weighted average value of the first random variable $x_t$ in which a larger weighting value is given to the newer time-series value in a period before the time t−1 in the first period, and $\sigma1_{t-1}$ is a weighted variance value of the first random variable $x_t$ in which a larger weighting value is given to the newer time-series value in a period before the time t−1 in the first period.

$$p(x_t) = \frac{1}{\sqrt{2\pi}\,\sigma1_{t-1}} \exp\left(-\frac{1}{2}\frac{(x_t - w1_{t-1})^2}{\sigma1_{t-1}^2}\right) \quad \text{[Equation 11]}$$

(Supplementary Note 13)

The abnormal value detection method for the satellite positioning system described in any one of supplementary notes 9 to 12 characterized by including the step of:

calculating ULI(t) as the uncertainty index at the time t by using the following equation 12, where $x_t$ is the first random variable at the time t and $p_{t-1}(x_t|x_{t-1})$ is the first probability density function at the time t−1.

$$ULI(t) = -\log(p_{t-1}(x_t|x^{t-1})) \quad \text{[Equation 12]}$$

(Supplementary Note 14)

The abnormal value detection method for the satellite positioning system described in any one of supplementary notes 9 to 13 characterized by including the step of:

calculating the second random variable $y_t$ that is an average value of the uncertainty index in the second period before the time t by using the following equation 13, where T2 is the second period and ULI(i) is the uncertainty index corresponding to a time i.

$$y_t = \frac{1}{T2}\sum_{i=t-T2+1}^{t} ULI(i) \quad \text{[Equation 13]}$$

(Supplementary Note 15)

The abnormal value detection method for the satellite positioning system described in supplementary note 14 characterized by including the step of:

obtaining the second probability density function $q(y_t)$ as the second probability distribution by using the following equation 14, where $w2_{t-1}$ is a weighted average value of the second random variable $y_t$ in which a larger weighting value is given to the newer time-series value in a period before the time t−1 in the first period and $\sigma2_{t-1}$ is a weighted variance value of the second random variable $y_t$ in which a larger weighting value is given to the newer time-series value in a period before the time t−1 in the first period.

$$q(y_t) = \frac{1}{\sqrt{2\pi}\,\sigma2_{t-1}} \exp\left(-\frac{1}{2}\frac{(y_t - w2_{t-1})^2}{\sigma2_{t-1}^2}\right) \quad \text{[Equation 14]}$$

(Supplementary Note 16)

The abnormal value detection method for the satellite positioning system described in supplementary note 10 or supplementary note 15 characterized by including the step of:

calculating CPI(t) as the change point index at the time t by using the following equation 15, where T4 is the fourth period before the time t−1 and $q_{i-1}(y_i|y_{i-1})$ is the second probability density function at the time i.

$$CPI(t) = \frac{1}{T4}\sum_{i=t-T4+1}^{t} (-\log(q_{i-1}(y_i|y^{i-1}))) \quad \text{[Equation 15]}$$

(Supplementary Note 17)

An abnormal value detection program for a satellite positioning system which causes a computer to execute:

a process of taking a time-series value that is a target for detection of an abnormal value in the satellite positioning system as a first random variable, calculating a first probability density function in a first period before a predetermined time based on weighted statistics of the time-series value, and obtaining the first probability density function as a first probability distribution;

a process of calculating a decision content of the first random variable at time t−1 just before time t as an uncertainty index based on the first probability distribution obtained at each time t that is a unit time in the first period;

a process of calculating an average value of the uncertainty index in a second period shorter than the first period before the time t;

a process of taking the calculated average value as a second random variable, calculating a second probability density function in the first period based on weighted statistics of the second random variable, and obtaining the second probability density function as a second probability distribution;

a process of calculating an average information content of the second probability distribution in the second period before the time t−1 just before time t at which the second probability distribution is obtained as a change point index based on the second probability distribution obtained at each time t; and a process of comparing the calculated change point index with a threshold value set in advance and detecting the time-series value corresponding to the change point index whose value is greater than the threshold value as the abnormal value.

(Supplementary Note 18)

The abnormal value detection program for the satellite positioning system described in supplementary note 17 characterized by including:

taking the average value as the second random variable, calculating the second probability density function in a third period whose length is shorter than or equal to that of the first period based on weighted statistics of the second random variable, and obtaining the second probability density function as the second probability distribution; and calculating an average information content of the second probability distribution in a fourth period whose length is shorter than or equal to that of the second period before the time t−1 as the change point index based on the second probability distribution corresponding to the time t−1.

(Supplementary Note 19)

The abnormal value detection program for the satellite positioning system described in supplementary note 17 or supplementary note 18 characterized in that:

the time-series value is data including a pseudo distance between each artificial satellite and a receiver in the satellite positioning system or a phase of a positioning signal that is obtained in time series based on the positioning signal from the artificial satellite that is received by the receiver.

(Supplementary Note 20)

The abnormal value detection program for the satellite positioning system described in any one of supplementary notes 17 to 19 characterized by including:

obtaining the first probability density function $p(x_t)$ as the first probability distribution by using the following equation 16, where $x_t$ is the first random variable at the time t, $w1_{t-1}$ is a weighted average value of the first random variable $x_t$ in which a larger weighting value is given to the newer time-series value in a period before the time t−1 in the first period, and $\sigma1_{t-1}$ is a weighted variance value of the first random variable $x_t$ in which a larger weighting value is given to the newer time-series value in a period before the time t−1 in the first period.

$$p(x_t) = \frac{1}{\sqrt{2\pi}\,\sigma1_{t-1}} \exp\left(-\frac{1}{2}\frac{(x_t - w1_{t-1})^2}{\sigma1_{t-1}^2}\right) \quad \text{[Equation 16]}$$

(Supplementary Note 21)

The abnormal value detection program for the satellite positioning system described in any one of supplementary notes 17 to 20 characterized by including:

calculating ULI(t) as the uncertainty index at the time t by using the following equation 17, where $x_t$ is the first random variable at the time t and $p_{t-1}(x_t|x_{t-1})$ is the first probability density function at the time t−1.

$$ULI(t) = -\log(p_{t-1}(x_t|x^{t-1})) \quad \text{[Equation 17]}$$

(Supplementary Note 22)

The abnormal value detection program for the satellite positioning system described in any one of supplementary notes 17 to 21 characterized by including:

calculating the second random variable $y_t$ that is an average value of the uncertainty index in the second period before the time t by using the following equation 18, where T2 is the second period and ULI(i) is the uncertainty index corresponding to a time i.

$$y_t = \frac{1}{T2}\sum_{i=t-T2+1}^{t} ULI(i) \quad \text{[Equation 18]}$$

(Supplementary Note 23)

The abnormal value detection program for the satellite positioning system described in supplementary note 22 characterized by including:

obtaining a second probability density function $q(y_t)$ as the second probability distribution by using the following equation 19, where $w2_{t-1}$ is a weighted average value of the second random variable $y_t$ in which a larger weighting value is given to the newer time-series value in a period before the time t−1 in the first period and $\sigma2_{t-1}$ is a weighted variance value of the second random variable $y_t$ in which a larger weighting value is given to the newer time-series value in a period before the time t−1 in the first period.

$$q(y_t) = \frac{1}{\sqrt{2\pi}\,\sigma2_{t-1}} \exp\left(-\frac{1}{2}\frac{(y_t - w2_{t-1})^2}{\sigma2_{t-1}^2}\right) \quad \text{[Equation 19]}$$

(Supplementary Note 24)

The abnormal value detection program for the satellite positioning system described in supplementary note 18 or supplementary note 23 characterized by including:

calculating CPI(t) as the change point index at the time t by using the following equation 20, where T4 is a fourth period before the time t−1 and $q_{i-1}(y_i|y_{i-1})$ is the second probability density function at the time i.

$$CPI(t) = \frac{1}{T4}\sum_{i=t-T4+1}^{t} (-\log(q_{i-1}(y_i|y^{i-1}))) \quad \text{[Equation 20]}$$

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

DESCRIPTION OF SYMBOL 10 abnormal value detection apparatus
11 abnormal value index calculation unit
12 dynamic model forming unit
13 abnormal value detection unit
121 first probability distribution obtaining unit
122 uncertainty index calculation unit
123 second probability distribution obtaining unit
124 change point index calculation unit 15 abnormal value detection apparatus
16 abnormal value detection apparatus

The invention claimed is:

1. An abnormal value detection apparatus for a satellite positioning system comprising:
first probability distribution obtaining unit which takes a time-series value that is a target for detection of an abnormal value in the satellite positioning system and is calculated from time-series data from an artificial satellite as a first random variable, calculating a first probability density function in a first predetermined period before a predetermined time based on weighted statistics which is an average value and a variance value of the time-series value, and obtaining the first probability density function as a first probability distribution;
uncertainty index calculation unit which calculates a decision content of the first random variable at time t−1 just before time t at which the first random variable is calculated as an uncertainty index based on the first probability distribution obtained by the first probability distribution obtaining unit at each time t that is a unit time in the first period;
second probability distribution obtaining unit which calculates an average value of the uncertainty index calculated by the uncertainty index calculation unit in a second period which is shorter than the first period and is a period before the time t, taking the average value as a second random variable, calculating a second probability density function in the first period based on weighted statistics which is an average value and a variance value of the second random variable, and obtaining the second probability density function as a second probability distribution;
change point index calculation unit which calculates an average information content of the second probability distribution in the second period before the time t−1 just before the time t at which the second probability distribution is obtained as a change point index based on the second probability distribution obtained at each time t by the second probability distribution obtaining unit; and
abnormal value detection unit which compares the change point index calculated by the change point index calculation unit with a threshold value set in advance and detecting the time-series value corresponding to the change point index whose value is greater than the threshold value as the abnormal value.

2. The abnormal value detection apparatus for the satellite positioning system described in claim 1 characterized in that:
the second probability distribution obtaining unit calculate an average value of the uncertainty index in the second period, take the average value as the second random variable, calculate the second probability density function in a third period whose length is shorter than or equal to that of the first period based on weighted statistics of the second random variable, and obtain the second probability density function as the second probability distribution; and
the change point index calculation unit calculate an average information content of the second probability distribution in a fourth period whose length is shorter than or equal to that of the second period before the time t−1 based on the second probability distribution corresponding to the time t−1 as the change point index.

3. The abnormal value detection apparatus for the satellite positioning system described in claim 1 characterized in that:
the time-series value is data including a pseudo distance between each artificial satellite and a receiver in the satellite positioning system or a phase of a positioning signal that is obtained in time series based on the positioning signal from the artificial satellite that is received by the receiver.

4. The abnormal value detection apparatus for the satellite positioning system described in claim 1 characterized in that:
the first probability distribution obtaining unit obtain a first probability density function $p(x_t)$ as the first probability distribution by using the following equation 1, where $x_t$ is the first random variable at the time t, $w1_{t-1}$ is a weighted average value of the first random variable $x_t$ in which a larger weighting value is given to the newer time-series value in a period before the time t−1 in the first period, and $\sigma 1_{t-1}$ is a weighted variance value of the first random variable $x_t$ in which a larger weighting value is given to the newer time-series value in a period before the time t−1 in the first period $$p(x_t) = \frac{1}{\sqrt{2\pi}\,\sigma 1_{t-1}} \exp\left(-\frac{1}{2} \frac{(x_t - w1_{t-1})^2}{\sigma 1_{t-1}^2}\right).$$ [Equation 1]

5. The abnormal value detection apparatus for the satellite positioning system described in claim 1 characterized in that:
the uncertainty index calculation unit calculates ULI(t) as the uncertainty index at the time t by using the following equation 2, where $x_t$ is the first random variable at the time t and $p_{t-1}(x_t|x_{t-1})$ is the first probability density function at the time t−1

$$ULI(t) = -\log(p_{t-1}(x_t|x^{t-1}))$$ [Equation 2].

6. The abnormal value detection apparatus for the satellite positioning system described in claim 1 characterized in that:
the second probability distribution obtaining unit calculate the second random variable $y_t$ that is an average value of the uncertainty index in the second period before the time t by using the following equation 3, where T2 is the second period and ULI(i) is the uncertainty index corresponding to a time i and $$y_t = \frac{1}{T2} \sum_{i=t-T2+1}^{t} ULI(i)$$ [Equation 3]

further obtain a second probability density function $q(y_t)$ as the second probability distribution by using the following equation 4, where $w2_{t-1}$ is a weighted average value of the second random variable $y_t$ in which a larger weighting value is given to the newer time-series value in a period before the time t−1 in the first period and $\sigma 2_{t-1}$ is a weighted variance value of the second random variable $y_t$ in which a larger weighting value is given to the newer time-series value in a period before the time t−1 in the first period $$q(y_t) = \frac{1}{\sqrt{2\pi}\,\sigma 2_{t-1}} \exp\left(-\frac{1}{2} \frac{(y_t - w2_{t-1})^2}{\sigma 2_{t-1}^2}\right).$$ [Equation 4]

7. The abnormal value detection apparatus for the satellite positioning system described in claim 2 characterized in that:

the change point index calculation unit calculate CPI(t) as the change point index at the time t by using the following equation 5, where T4, is the fourth period before the time t−1 and $q_{i-1}(y_i|y_{i-1})$ is the second probability density function at the time i $$CPI(t) = \frac{1}{T4} \sum_{i=t-T4+1}^{t} (-\log(q_{i-1}(y_i | y^{i-1}))). \quad \text{[Equation 5]}$$

8. An abnormal value detection method executed in an abnormal value detection apparatus of a satellite positioning system including the steps of:
 taking a time-series value that is a target for detection of an abnormal value in the satellite positioning system and is calculated from time-series data from an artificial satellite as a first random variable, calculating a first probability density function in a first predetermined period before a predetermined time based on weighted statistics which is an average value and a variance value of the time-series value, and obtaining the first probability density function as a first probability distribution;
 calculating a decision content of the first random variable at time t−1 just before time t at which the first random variable is calculated as an uncertainty index based on the first probability distribution calculated at each time t that is a unit time in the first period;
 calculating an average value of the uncertainty index calculated in a second period which is shorter than the first period and is a period before the time t;
 taking the average value as a second random variable, calculating a second probability density function in the first period based on weighted statistics which is an average value and a variance value of the second random variable, and obtaining the second probability density function as a second probability distribution;
 calculating an average information content of the second probability distribution in the second period before the time t−1 just before the time t at which the second probability distribution is obtained as a change point index based on the second probability distribution calculated at each time t; and
 comparing the calculated change point index with a threshold value set in advance and detecting the time-series value corresponding to the change point index whose value is greater than the threshold value as the abnormal value.

9. The abnormal value detection method executed in the abnormal value detection apparatus for the satellite positioning system described in claim 8 characterized by including the steps of:
 taking the average value as the second random variable, calculating the second probability density function in a third period whose length is shorter than or equal to that of the first period based on weighted statistics of the second random variable, and obtaining the second probability density function as the second probability distribution and
 calculating an average information content of the second probability distribution in a fourth period whose length is shorter than or equal to that of the second period before the time t−1 based on the second probability distribution corresponding to the time t−1 as the change point index.

10. A non-transitory computer readable medium embodying an abnormal value detection program for a satellite positioning system which causes a computer to execute:
 a process of taking a time-series value that is a target for detection of an abnormal value in the satellite positioning system and is calculated from time-series data from an artificial satellite as a first random variable, calculating a first probability density function in a first predetermined period before a predetermined time based on weighted statistics which is an average value and a variance value of the time-series value, and obtaining the first probability density function as a first probability distribution;
 a process of calculating a decision content of the first random variable at time t−1 just before time t at which the first random variable is calculated as an uncertainty index based on the first probability distribution calculated at each time t that is a unit time in the first period;
 a process of calculating an average value of the uncertainty index calculated in a second period which is shorter than the first period and is a period before the time t;
 a process of taking the average value as a second random variable, calculating a second probability density function in the first period based on weighted statistics which is an average value and a variance value of the second random variable, and obtaining the second probability density function as a second probability distribution;
 a process of calculating an average information content of the second probability distribution in the second period before the time t−1 just before the time t at which the second probability distribution is obtained as a change point index based on the second probability distribution calculated at each time t; and
 a process of comparing the calculated change point index with a threshold value set in advance and detecting the time-series value corresponding to the change point index whose value is greater than the threshold value as the abnormal value.

* * * * *